US012553367B2

(12) United States Patent
 Carlson (10) Patent No.: US 12,553,367 B2
(45) Date of Patent: Feb. 17, 2026

(54) ELECTROLYZER HEATING SYSTEM FOR INTEGRATED POWER PLANTS

(71) Applicant: Mitsubishi Power Americas, Inc., Lake Mary, FL (US)

(72) Inventor: Todd Eric Carlson, Lake Mary, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 18/810,592

(22) Filed: Aug. 21, 2024

(65) Prior Publication Data

US 2024/0410302 A1   Dec. 12, 2024

Related U.S. Application Data

(63) Continuation of application No. 18/228,480, filed on Jul. 31, 2023, now Pat. No. 12,091,992.
(Continued)

(51) Int. Cl.
 *F01K 23/10*   (2006.01)
(52) U.S. Cl.
 CPC .......... *F01K 23/10* (2013.01); *F05D 2220/72* (2013.01); *F05D 2220/74* (2013.01);
(Continued)

(58) Field of Classification Search
 CPC .. F01K 23/10; F02C 3/30; F02C 3/305; F02C 6/18; F23R 3/36
 See application file for complete search history.

(56) References Cited

U.S. PATENT DOCUMENTS

| 864,747 A | 8/1907 | Wilson |
| 3,954,592 A | 5/1976 | Horvath |

(Continued)

FOREIGN PATENT DOCUMENTS

| CN | 102965687 B | 11/2015 |
| CN | 205803606 U | 12/2016 |

(Continued)

OTHER PUBLICATIONS

U.S. Appl. No. 18/228,480, filed Jul. 31, 2023, Electrolyzer Heating System for Integrated Power Plants.
(Continued)

*Primary Examiner* — Thuyhang N Nguyen
(74) *Attorney, Agent, or Firm* — Schwegman Lundberg & Woessner, P.A.

(57) ABSTRACT

A power plant comprises a steam system, a first electrolyzer, a heat storage system, and a heat exchanger configured to exchange thermal energy between the steam system, the first electrolyzer and the heat storage system. A method of operating an electrolyzer in a combined cycle power plant comprises operating a steam system to convert water to steam, operating an electrolyzer in a standby mode, the electrolyzer configured to convert water and electricity to hydrogen and oxygen when the electrolyzer is in an operating mode, circulating water from the steam system through a heat exchanger, circulating a first heat transfer medium between the electrolyzer and the heat exchanger, and circulating a second heat transfer medium between the heat exchanger and a thermal storage container.

20 Claims, 6 Drawing Sheets

Related U.S. Application Data (60) Provisional application No. 63/394,368, filed on Aug. 2, 2022.

(52) U.S. Cl.
CPC ...... *F05D 2220/75* (2013.01); *F05D 2240/35* (2013.01); *F05D 2260/2322* (2013.01)

(56) References Cited

U.S. PATENT DOCUMENTS

| | | | |
|---|---|---|---|
| 4,081,337 A | 3/1978 | Spitzer | |
| 5,312,843 A | 5/1994 | Yamauchi et al. | |
| 5,479,462 A * | 12/1995 | Yamauchi | C07C 29/1518 |
| | | | 376/325 |
| 5,964,089 A | 10/1999 | Murphy et al. | |
| 6,036,827 A | 3/2000 | Andrews et al. | |
| 7,188,478 B2 | 3/2007 | Bourgeois | |
| 7,331,178 B2 | 2/2008 | Goldman | |
| 7,331,179 B2 | 2/2008 | Balan et al. | |
| 7,381,313 B2 | 6/2008 | Libby et al. | |
| 8,117,999 B2 | 2/2012 | Cerny et al. | |
| 8,196,405 B2 | 6/2012 | Wolf | |
| 8,647,478 B2 | 2/2014 | Aujollet | |
| 8,652,308 B2 | 2/2014 | Aujollet | |
| 9,422,631 B2 | 8/2016 | Bulan et al. | |
| 9,885,257 B2 | 2/2018 | Bergins et al. | |
| 10,011,909 B2 | 7/2018 | Emerick | |
| 10,036,291 B2 | 7/2018 | Kotrba et al. | |
| 10,208,665 B2 | 2/2019 | Simpson | |
| 10,322,788 B2 | 6/2019 | Jung et al. | |
| 11,041,246 B2 | 6/2021 | Mohri et al. | |
| 11,473,504 B2 | 10/2022 | Bowen et al. | |
| 11,852,082 B2 * | 12/2023 | Frey | F02C 9/40 |
| 12,025,061 B2 * | 7/2024 | Wang | F02C 7/36 |
| 2008/0289955 A1 | 11/2008 | Balestrino et al. | |
| 2011/0041740 A1 | 2/2011 | Reilly | |
| 2013/0042626 A1 | 2/2013 | Johnston | |
| 2014/0203557 A1 * | 7/2014 | Kim | F01K 23/101 |
| | | | 60/39.12 |
| 2016/0164128 A1 | 6/2016 | Ono et al. | |
| 2019/0006695 A1 | 1/2019 | Swiegers et al. | |
| 2019/0319285 A1 * | 10/2019 | Milos | H01M 8/0606 |
| 2021/0071310 A1 | 3/2021 | Oto et al. | |
| 2021/0156036 A1 | 5/2021 | Klink et al. | |
| 2022/0065162 A1 | 3/2022 | Hunt et al. | |
| 2022/0170387 A1 * | 6/2022 | O'Donnell | H01M 8/04074 |
| 2022/0389844 A1 | 12/2022 | Zemlak et al. | |
| 2023/0112330 A1 | 4/2023 | Broy et al. | |
| 2024/0044264 A1 | 2/2024 | Carlson | |

FOREIGN PATENT DOCUMENTS

| | | |
|---|---|---|
| CN | 106757121 A | 5/2017 |
| CN | 104388971 B | 7/2017 |
| CN | 105862062 B | 5/2018 |
| CN | 108754527 B | 2/2020 |
| CN | 211025197 U | 7/2020 |
| CN | 211142192 U | 7/2020 |
| CN | 111621799 A | 9/2020 |
| CN | 111748822 A | 10/2020 |
| CN | 110670087 B | 11/2020 |
| CN | 112290581 A | 1/2021 |
| CN | 112391641 A | 2/2021 |
| CN | 213013112 U | 4/2021 |
| CN | 113249736 A | 8/2021 |
| CN | 113445060 A | 9/2021 |
| CN | 113718277 A | 11/2021 |
| CN | 215481305 U | 1/2022 |
| CN | 114087904 A | 2/2022 |
| DE | 102012214907 A1 | 10/2013 |
| DE | 202014001883 U1 | 3/2014 |
| DE | 102012214907 B4 | 5/2015 |
| DE | 102005017727 B4 | 9/2015 |
| DE | 102016202259 B4 | 7/2019 |
| EP | 2780491 B1 | 10/2015 |
| JP | 4711492 B2 | 4/2011 |
| JP | 4842585 B2 | 10/2011 |
| JP | 5982253 B2 | 8/2016 |
| JP | 6410458 B2 | 10/2018 |
| KR | 20120139212 A | 12/2012 |
| KR | 20190032999 A | 3/2019 |

OTHER PUBLICATIONS

"U.S. Appl. No. 18/228,480, Non Final Office Action mailed Feb. 29, 2024", 19 pgs.

"U.S. Appl. No. 18/228,480, Notice of Allowance mailed May 20, 2024", 9 pgs.

"U.S. Appl. No. 18/228,480, Response filed Apr. 23, 2024 to Non Final Office Action mailed Feb. 29, 2024", 18 pgs.

* cited by examiner

ELECTROLYZER HEATING SYSTEM FOR INTEGRATED POWER PLANTS

PRIORITY APPLICATIONS

This application is a continuation of U.S. patent application Ser. No. 18/228,480, filed Jul. 31, 2023, which application claims the benefit of priority to U.S. Provisional Patent Application Ser. No. 63/394,368, filed Aug. 2, 2022, the contents of which are incorporated by reference in their entireties.

TECHNICAL FIELD

This document pertains generally, but not by way of limitation, to combined-cycle power plants used to generate electricity. More specifically, but not by way of limitation, the present application relates to production of hydrogen and oxygen with electrolyzers in integrated combined-cycle power plants.

BACKGROUND

The grid is a mechanism to balance aggregate energy demand of consumers with aggregate energy supply of power producers, including renewable energy sources and traditional power plants, such as those that burn fossil fuels.

Renewable energy sources can comprise sources of energy that do not include combustion or release of CO2. Typical renewable energy sources include hydroelectric, solar and wind. Solar and wind, particularly, are intermittent and unpredictable.

Power plants can comprise a means to generate power on demand using fuels, such as fossil fuels or hydrogen derived from various sources. Fossil fuels can comprise coal, natural gas or fuel oil. Typical power plants comprise a gas turbine and an electrical generator, and frequently include a steam turbine in a combined-cycle configuration. The gas turbine and steam turbine can create electric power from mechanical energy converted from combustion of fuel and associated steam generation processes.

Consumers of electricity comprise any user of electrical power. Consumers can be residential consumers, commercial consumers or industrial consumers. Consumers can use energy in different ways, thereby placing widely differing demands on the grid.

Various factors can have a substantial impact on grid stability. Specifically, (1) when a large industrial consumer initiates (or discontinues) use of large quantities of power; or (2) when there are large variations in the demand for power by residential and/or commercial consumers during (a) peak periods, such as morning and evening, versus off-peak periods, such as over-night and mid-day and (b) seasonal variations in demand such as cooling load in summer, heating load in winter and relatively low demand for either in spring and fall; or (3) when the types of loads change on a system, such as large amounts of active loads being initiated or discontinued such as lighting with the rise and fall of daylight, and electric heaters that are initiated or discontinued as occurs with changing temperatures within the winter season; or (4) when the types of generation available changes, such as wind, solar, nuclear or fossil fuels with changing weather patterns at both a local, regional and national scale, either (a) in the short term in the case of changing weather systems or (b) on a seasonal basis as occurs with the transition from spring to summer to autumn to winter; or (5) how the consumers use the power can influence active and reactive power availability in addition to system voltage and frequency.

Attempts to balance grid supply and demand have involved the use of electrolyzers to produce hydrogen gas with power from the grid when renewable energy is plentiful, for example, for later usage in a gas turbine combined cycle power plant (GTCC) when demand is high or renewable energy is unavailable.

Pub. No. US 2022/0065162 A1 to Hunt et al., is titled "Integrated Power Production and Storage Systems."

OVERVIEW

The present inventor has recognized, among other things, that problems to be solved in combined-cycle power plants using electrolyzers can include the desirability of operating the electrolyzers at operating temperatures. Many electrolyzers typically operate above ambient temperatures, which are typically around 90 degrees C. For example, electrolyzers can operate at temperatures in the range of approximately 80 degrees C. to approximately 90 degrees C., or higher. It can take a long period of time before an electrolyzer comes up to operating temperature from ambient temperature to be able to produce hydrogen and oxygen at peak efficiency. This warmup period will consume power without producing the product gases. There can also be a delay in production output where full capacity is not reached until the unit is at the proper temperature. For example, it can take over an hour for an electrolyzer to come online from a cold, e.g., ambient, temperature. As such, the ability of the combined-cycle power plant to respond to grid conditions can be impeded.

The present subject matter can provide solutions to this problem and other problems, such as by incorporating systems, devices and methods that can maintain, or quickly elevate, electrolyzer temperatures, thereby facilitating rapid electrolyzer start-up and output. Under normal circumstances, electrolyzers take time to start operating at large volumes of power consumption, e.g., large volumes of hydrogen and oxygen output, due to the need to heat the large volume of electrolyte water within the units. With the present disclosure, electrolyzers can be integrated with heat from a gas turbine combined cycle (GTCC) power plant, as well as other sources, to heat the electrolyte. Heat from the GTCC power plant, other operating electrolyzers and other sources can be stored to heat non-operating electrolyzers. In examples, the stored heat can be used to actively maintain non-operating electrolyzers at, or very near, operating temperatures or can be used to reactively heat non-operating electrolyzers on-demand at a later time in a rapid fashion. As such, in response to large power demand drop from a consumer, for example, the grid can command the electrolyzer to immediately, or within a very short time, begin to consume electricity to convert water into hydrogen and oxygen gas. If the electrolyzer electricity capacity is equal to or greater than the amount of power that the consumer had been using, initiation of conversion of water to hydrogen and oxygen can maintain grid balance without any need to alter the operating profile of the gas turbine.

In an example, a power plant comprises a steam system, a first electrolyzer, a heat storage system, and a heat exchanger configured to exchange thermal energy between the steam system, the first electrolyzer and the heat storage system.

In another example, a method of operating an electrolyzer in a combined cycle power plant comprises operating a steam system to convert water to steam, operating an electrolyzer in a standby mode, the electrolyzer configured to convert water and electricity to hydrogen and oxygen when the electrolyzer is in an operating mode, circulating water from the steam system through a heat exchanger, circulating a first heat transfer medium between the electrolyzer and the heat exchanger, and circulating a second heat transfer medium between the heat exchanger and a thermal storage container.

In another example, an integrated power production system comprises a combined cycle power plant comprising a gas turbine engine and a steam system, first and second generators configured to be driven by the gas turbine engine and the steam system to supply power to a grid system, an electrolyzer configured to convert water to hydrogen gas and oxygen gas with an electrical input, an electrolyzer heat retention system, and a controller. The electrolyzer heat retention system comprises a heat storage system, a heat exchanger comprising a first heat exchange circuit in thermal communication with the electrolyzer and a second heat exchange circuit in thermal communication with the steam system, and a third heat exchange system in thermal communication with the heat storage system. The controller can be configured to transfer heat from the second heat exchange circuit to the third heat exchange circuit and transfer heat from the third heat exchange circuit to the first heat exchange circuit.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
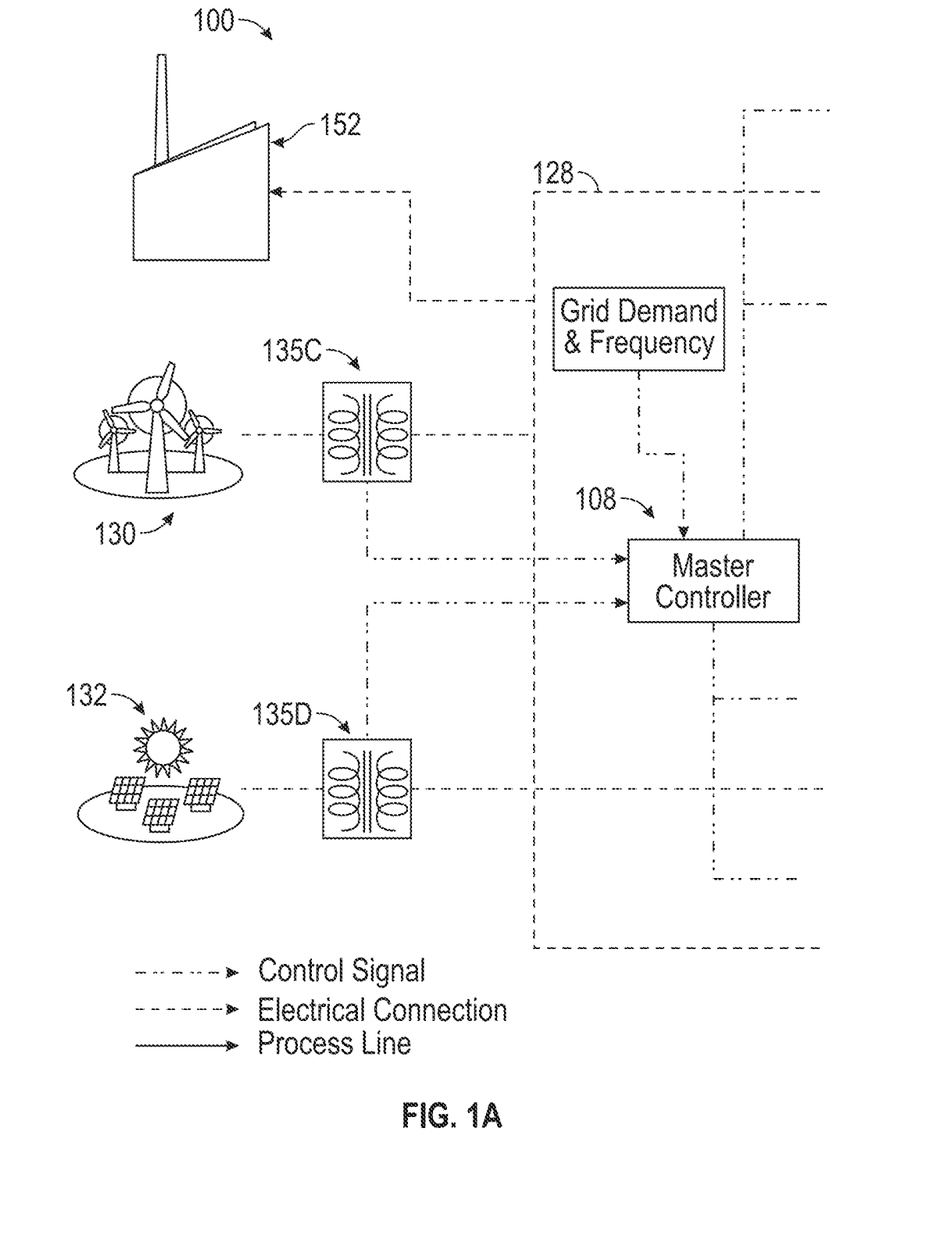
FIGS. 1A and 1B together form a schematic diagram illustrating an integrated power production system comprising a gas turbine combined cycle power plant (GTCC), a hydrogen production system, an electrolyzer heat retention system, a hydrogen storage system, and a controller.
Figure 1B:
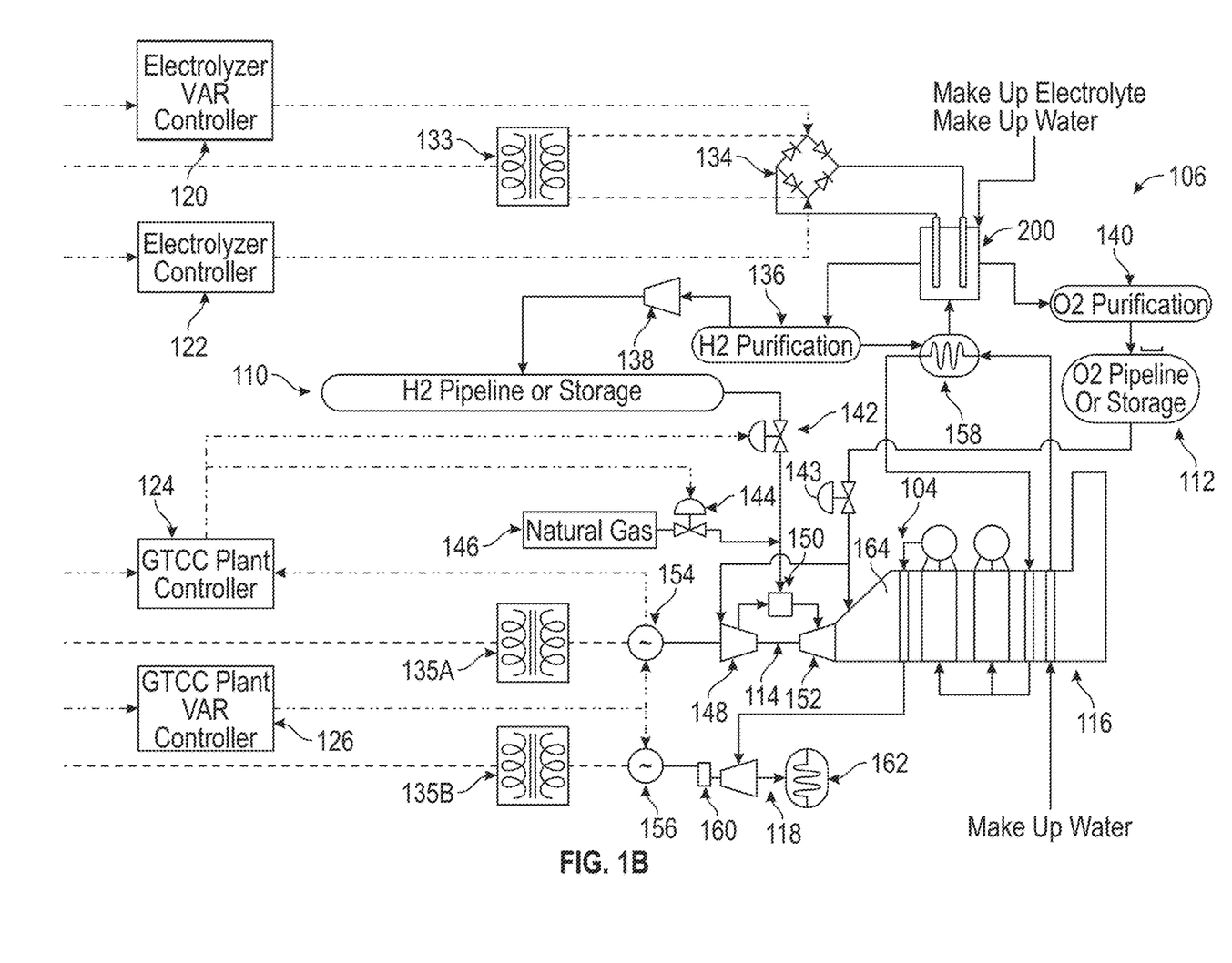

FIGS. 1A and 1B together form a schematic diagram illustrating integrated power production system 100 that provides many advantages over standard and prior art systems. System 100 can include gas turbine combined cycle power plant (GTCC) 104, hydrogen production system 106, and controller 108.

Control signals between various components and systems are designated via dash/dot lines, electrical connections through which electricity can flow are designated via dashed lines, and process lines, through which gases or fluids can flow, are designated via solid lines.

In examples, hydrogen production system 106 can comprise one or more electrolyzers, such as electrolyzer 200, that produces hydrogen gas (H2) and oxygen gas (O2). A single hydrogen production system 106 or electrolyzer is shown in FIGS. 1A and 1B, but more than one hydrogen production system 106 or electrolyzer can be used. Power production system 100 can also include either or both of hydrogen storage system 110 and oxygen storage system 112. As is discussed below in greater detail, electrolyzer 200 can be incorporated into electrolyzer heat retention system 202 (FIG. 2) to transfer heat from other portions of integrated power production system 100, such as GTCC 104, to electrolyzer 200.

GTCC 104 can comprise gas turbine 114, heat recovery steam generator 116, and steam turbine 118.

Controller 108 can be connected to hydrogen production system 106 via controllers 120 and 122. Controller 108 can be connected to GTCC 104 via controllers 124 and 126.

Grid 128 provides electrical connection between various supplies of electricity, such as renewable wind electricity sources 130, renewable photovoltaic solar electricity sources 132 or gas turbine combined cycle power plant 104, and consumers 152 of electricity. Example consumers 152 include residential homes, commercial buildings, and industrial facilities. Different consumers 152 can utilize varying levels of active and reactive power.

Although only one consumer 152, one renewable wind electricity source 130, one renewable photovoltaic solar electricity source 132, one GTCC 104, one hydrogen production system 106, one hydrogen storage system 110 and one oxygen storage system 112 are shown in FIGS. 1A and 1B, power production system 100 can include multiple instances of each, cither at the same geographic locations or dispersed over a large geographic region.

Master controller 108 provides, among other things, command signals to the various supplies of electricity, including wind electricity sources 130, renewable photovoltaic solar electricity sources 132, and gas turbine 114, to ensure that the total supply and demand for electricity remains balanced. Master controller 108, in conjunction with electrolyzer production and VAR (volt-ampere reactive) set point controllers 122, 120, respectively, and GTCC output and VAR setpoint controllers 124, 126, respectively, can ensure balance between supply and demand of active power, reactive power, system voltage and frequency. Master controller 108 can also regulate when hydrogen is produced, or consumed, and when power is dispatched by using the stored hydrogen or producing hydrogen for storage. As discussed with reference to FIGS. 2-5, controllers 108, 120 and 122 can provide instructions to the various components of integrated power production system 100 to provide heat input to electrolyzer 200 using heat available from GTCC 104 and other operating electrolyzers, as well as other heat sources.

Decisions of master controller 108 can be made based on market conditions, renewable power availability, grid electricity costs, and other factors. Thus, master controller 108 can manage power production from renewable wind electricity sources 130, renewable photovoltaic solar electricity sources 132 and GTCC 104 based on demand on grid 128, weather conditions and other factors, while also managing hydrogen production of hydrogen production system 106 using, for example, consumption of hydrogen and oxygen in GTCC 104 and an industrial facility and long term and short term storage of energy in the form of hydrogen and oxygen storage in hydrogen storage system 110 and oxygen storage system 112, respectively, and power in various batteries.

Electricity from grid 128 can be first provided to transformer 133 to transform the voltage of grid 128 to a selected voltage that is optimized for operation of power converter 134 to convert AC power to DC power. In examples, converter 134 can be a rectifier and can be receptive of alternating current (AC) from grid 128, and productive of direct current (DC) as can be optimal for operation of electrolyzers of hydrogen production system 106. GTCC 104, steam turbine 118, renewable wind electricity sources 130 and renewable photovoltaic solar electricity sources 132 can be provided with transformers 135A-135D, respectively, to transform voltage of generated power to a voltage compatible with grid 128.

Hydrogen production system 106 can be connected to hydrogen purification system 136, which can use hydrogen compressor 138 to provide hydrogen to hydrogen storage system 110, and oxygen purification system 140, which can provide oxygen to oxygen storage system 112. Hydrogen purification system 136 can comprise a palladium membrane hydrogen purifier, a dense thin-metal membrane purifier, a pressure swing adsorption system, a catalytic recombination or deoxygenation purifier, or an electrochemical purifier, as well as others. Oxygen purification system 140 can utilize a cryogenic distillation process or a vacuum swing adsorption process. Valve 142 can be used to control flow of stored hydrogen to gas turbine 114. Valve 143 can be used to control flow of stored oxygen to HRSG 116. Valve 144 can be used to control flow of natural gas to gas turbine 114. Natural gas can be provided via natural gas source 146. Controller 108 can control flow of hydrogen, oxygen and natural gas to GTCC 104 based on many factors, such as availability of renewable energy, to optimize total output, power and hydrogen, of system 100.

Gas turbine combined cycle power plant 104 includes gas turbine 114, heat recovery steam generator (HRSG) 116, and steam turbine 118. The functions and operation of combined GTCC 104 will be appreciated by one of skill in the art and many of the details of which are not described here for brevity. Gas turbine 114 includes compressor 148, combustor 150, and turbine 152. Compressor 148, turbine 152 and electrical generator 154 can be physically connected via one or more shafts, and turn together. Air is introduced to compressor 148, compressor 148 compresses the air, and fuel is introduced to the compressed air in combustor 150. The fuel is ignited, and the combustion products have greatly increased temperature and pressure (and energy) relative to that of the compressed air. The high energy combustion products expand in turbine 152 driving compressor 148 and electrical generator 154.

After the high energy combustion products exit gas turbine 114, they are referred to as exhaust gas, and are channeled through HRSG 116. HRSG 116 can include one or more heat exchange assemblies that transfer heat from the exhaust gas to water. The water can be in the form of liquid water (i.e., "feedwater") or steam. HRSG 116 can have various stages to produce steam at particular properties of temperature and pressure. The steam is then directed to steam turbine 118, which can be physically connected to generator 156 via clutch 160. In examples, clutch 160 can be omitted. From steam turbine 118, the steam can flow into heat exchanger 162, such as a condenser in which the steam can be cooled. Heat from steam and water from HRSG 116 can additionally be put into other systems. For example, as is discussed with reference to FIGS. 2-4, heat from the feedwater, condensate, or steam of HRSG 116 can be used to warm, e.g., elevate and maintain the temperature of, electrolyzers 200 of hydrogen production system 106 using, for example, condenser 158 or heat exchanger 162. Generator 156 can, in some examples, be the same generator connected to gas turbine 114, or in other examples can be a separate generator (as is shown in FIGS. 1A and 1B). The steam can expand within steam turbine 118, and transfer torque to generator 156 to create electricity. Thereafter the steam can be condensed to liquid water and return to HRSG 116 to be reheated to the particular properties. As is customary, it will be appreciated that the water can circulate between HRSG 116 and steam turbine 118 in a loop.

In examples, controller 108 is a master controller that is in signal communication with at least of one of electrolyzer VAR (volt-ampere reactive) set point controller 120, electrolyzer production set point controller 122, GTCC plant output controller 124, and GTCC plant VAR setpoint controller 126, each of which can be responsive to command signals provided by master controller 108 as described in further detail below.

Hydrogen production system 106 can produce hydrogen using a number of different processes. Thermochemical processes use heat and chemical reactions to release hydrogen from organic materials, such as fossil fuels and biomass, or from materials like water. Water (H2O) can also be split into hydrogen (H2) and oxygen (O2) using electrolysis, as can be provided by electrolyzer 200, or solar energy. Microorganisms such as bacteria and algae can produce hydrogen through biological processes.

In examples, hydrogen production system 106 comprises electrolyzer 200. Electrolyzer 200 can be an electrical device that can operate to consume electricity to convert water into its constituent elements, hydrogen and oxygen. Electrolyzer 200 can consume direct current electrical power and utilize converter 134 to convert alternating current to direct current. Hydrogen can be stored in hydrogen storage system 110, which can comprise a tank, pipeline, salt cavern or other geologic repository. Electrolyzer 200 of hydrogen production system 106 is generally receptive of inputs of water and electricity, and productive of hydrogen gas and oxygen gas, as would be appreciated by one of skill in the art.

Electricity can be provided via distribution grid 128. Grid 128 can obtain electricity from one or more of a variety of electrical sources, such as renewable wind electricity sources 130 and renewable photovoltaic solar electricity sources 132. Grid 128 can also obtain electricity from other sources, such as from hydroelectric sources, nuclear sources, one or both of generators 154 and 156 of gas turbine 114 and steam turbine 118, respectively, of GTCC 104 or other gas turbine generators connected to grid 128.

The operation of electrolyzer 200 of hydrogen production system 106 can be responsive to production set point controller 122. Production set point controller 122 can control the amount of direct current to provide to electrolyzer 200. Provision of direct current and water to electrolyzer 200 is directly related to the production of hydrogen gas and oxygen gas.

The operation of electrolyzer 200 of hydrogen production system 106 can also be responsive to electrolyzer VAR set point controller 120. VAR set point controller 122 can control the amount of alternating current that is converted to direct current to be provided to electrolyzer 200.

Power inverters convert DC to AC power. Power inverters are grid connected devices that allow for putting power into grid 128. Typical use of power inverters is unidirectional, and can be at renewable photovoltaic solar electricity sources 132 or fuel cells, for example.

In examples, converter 134 can include thyristor rectifier technology with transistor electronics, that can convert 1, 2, or 3 phase AC power to DC power. Such DC power output is typically unidirectional, not smooth, and is commonly used for electroplating, DC processes, and electrolyzer stacks.

In examples, converter 134 can include chopper rectifier technology, with a combination of silicon controlled rectifiers (SCRs) and insulated-gate bipolar transistors (IGBTs), that convert 1, 2, or 3 phase AC power to DC power. Such DC power output is typically unidirectional, not smooth and is commonly used for electroplating, DC processes, and electrolyzer stacks.

In examples, converter 134 can be a power conversion system (PCS) that will use IGBTs, and PWM (pulse wave modulation) to convert 1, 2 and 3 phase AC power to DC as well as taking DC power from a source, such as an electrochemical battery or wind or solar generators, and convert the DC power to AC power. Such PCSs are bidirectional and both AC and DC are "clean", close to pure waveforms, with no harmonics or "ripple", and is the typical technology used to provide active and reactive power services to grid 128.

It will be appreciated that electrolyzer 200 of hydrogen production system 106 can be receptive of water and DC electricity from converter 134 to produce hydrogen gas and oxygen gas. Some examples of electrolyzer 200 can also require an input of electrolyte, such as potassium hydroxide. The hydrogen gas can proceed to hydrogen purification system 136, hydrogen compressor 138, and into hydrogen storage system 110. Likewise, the oxygen gas can proceed to oxygen purification system 140 and into oxygen storage system 112. A similar oxygen compressor can optionally be used. Although examples have been described herein as hydroxide electrolytic electrolyzers, it will be appreciated that the scope of the disclosure is not so limited, and is contemplated to include other electrolyzer arrangements, such as polymer electrolyte membrane (PEM) electrolysis units.

Hydrogen storage system 110 can include a salt cavern to store the hydrogen gas. In some examples, hydrogen storage system 110 can include one or more lengths of pipe or pressure vessels such as "bullet" shape or spheres that are highly pressurized to store the hydrogen.

The hydrogen gas within the hydrogen storage system 110 can be used as a fuel, and provided to combustor 150 of gas turbine 114. Flow valves 142 and 144 can be responsive to GTCC plant output controller 124 to provide a flow of hydrogen and natural gas fuels to gas turbine 114. Under some conditions, controller 124 can command valves 142 and 144 such as to provide only one fuel (either natural gas or hydrogen) to gas turbine 114. Under other conditions, controller 124 can command valves 142 and 144 such as to provide a blend of both natural gas and hydrogen to gas turbine 114.

Relative to natural gas, combustion of hydrogen occurs at a higher temperature. Higher temperature combustion can be expected to result in increased production of oxides of nitrogen (NOx). In examples, the oxygen from oxygen storage system 112 can be provided, as "hot oxygen", to inlet duct 164 of the HRSG 116 to reduce the production of NOx.

As discussed herein, electrolyzer 200 can be heated using heat from HRSG 116, industrial process heat, district heating sources, commercial building heat and the like. Furthermore, heat from HRSG 116, industrial process heat, district heating sources, commercial building heat and the like can be stored using electrolyzer heat retention system 202 (FIG. 2) of the present disclosure to facilitate fast starts for electrolyzer 200. Controllers 120 and 122 can operate independently to maintain the temperature of electrolyzer 200 or can be commanded by controller 108 to rapidly increase the temperature of electrolyzer 200 when it is desirable to bring electrolyzer 200 online.

Figure 2:
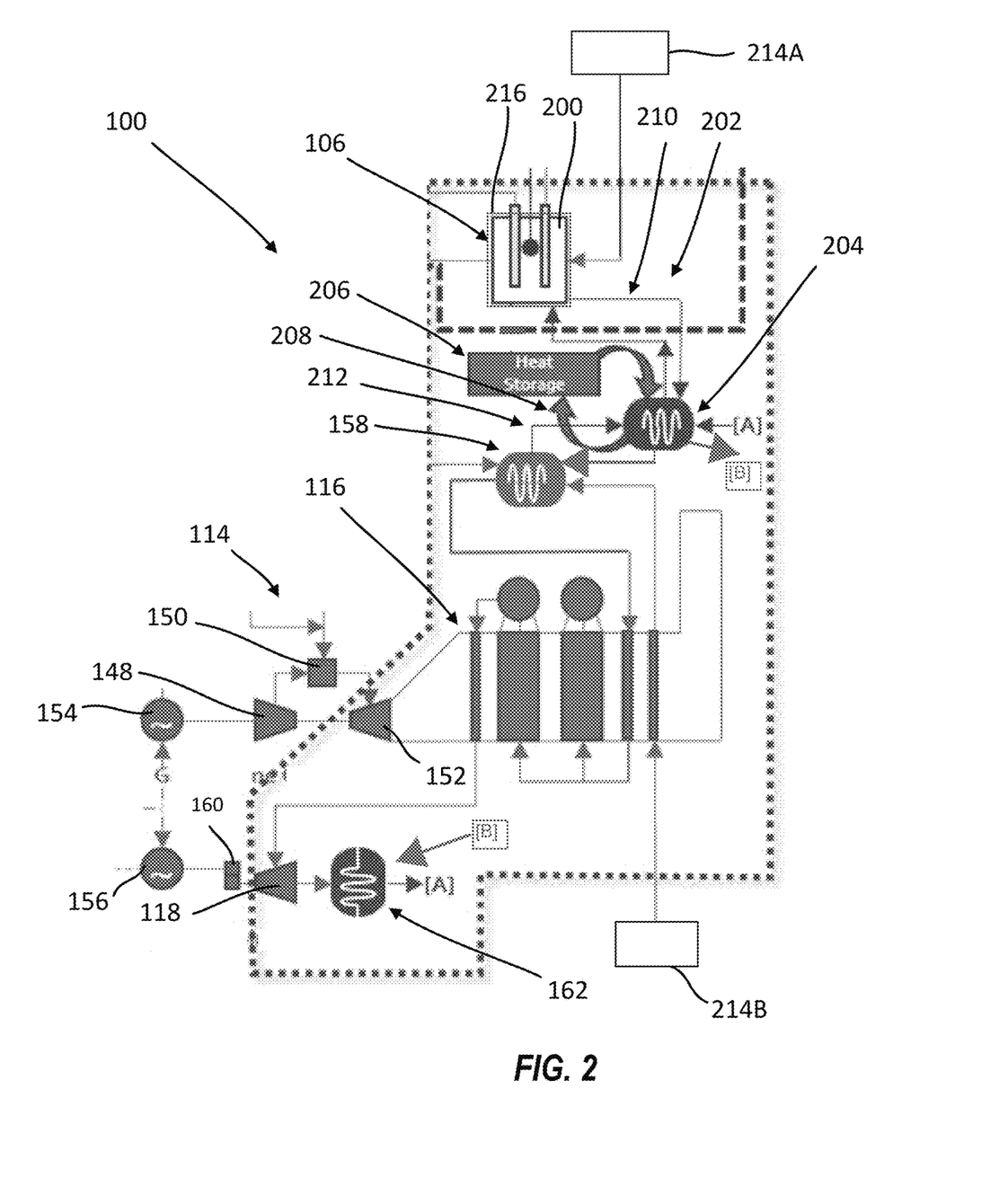
FIG. 2 is a schematic diagram illustrating the electrolyzer heat retention system incorporated into the hydrogen production system of the integrated power production system of FIGS. 1A and 1B.

FIG. 2 is a schematic diagram illustrating electrolyzer heat retention system 202 incorporated into hydrogen production system 106 of integrated power production system 100 of FIGS. 1A and 1B.

Electrolyzer heat retention system 202 can comprise heat exchanger 204 and heat storage system 206. Electrolyzer 200, heat exchanger 204 and heat storage system 206 can be interconnected by thermal loop 208 in which a working medium flows, transfer loop 210 in which a transfer medium flows, and water loop 212 in which water flow. Electrolyzer 200 can be connected to make-up water source 214A and HRSG 116 can be connected to make-up water source 214B. Electrolyzer 200 can be provided with jacket 216 in which the transfer medium can flow. Jacket 216 can comprise a shell or structure or conduit array, e.g., one or more windings of conduit or piping through which the transfer medium can flow, surrounding or partially surrounding the body or housing of electrolyzer 200 to provide a flow space for a transfer medium to flow.

As discussed with reference to FIGS. 1A and 1B, hydrogen production system 106 can be integrated with other portions of integrated power production system 100, such as HRSG 116, gas turbine 114, steam turbine 118, condenser 158 and clutch 160. Gas turbine 114 includes compressor 148, combustor 150, and turbine 152.

Heat can be exchanged between heat storage system 206 and heat exchanger 204 using thermal loop 208. Heat can be put into and removed from heat storage system 206, depending on operational needs of integrated power production system 100. In examples, thermal loop 208 can circulate a working medium. As discussed in greater detail below, the working medium can have the ability to retain heat.

Heat can be exchanged between electrolyzer 200 and heat exchanger 204 using transfer loop 210. Heat can be put into and removed from electrolyzer 200, depending on operational needs of integrated power production system 100. In examples, transfer loop 210 can circulate a transfer medium having high thermal conductivity properties. As discussed in greater detail below, the transfer medium can have the ability to transfer heat.

Heat can be exchanged between HRSG 116 and heat exchanger 204 using water loop 212. Heat can be put into and removed from HRSG 116, depending on operational needs of integrated power production system 100. In examples, water loop 212 can circulate feedwater or steam from one or more locations of HRSG 116. For example, in addition or alternatively to water loop 212, HRSG 116 can be connected to heat exchanger 204 via heat exchanger 162. In examples, heat exchanger 162 can comprise a condenser such that water can be provided to heat exchanger 204 via line [A] and returned to heat exchanger 162 via line [B].

In the illustrated example, heat can be provided to heat storage system 206 via HRSG 116, which can provide steam or feedwater to heat exchanger 204. However, heat can also be provided to heat storage system 206 via electrolyzer 200 itself or other electrolyzers, such as electrolyzer 200' (FIG. 3), industrial processes, commercial sources, and the like. Sufficient heat can be stored in heat storage system 206 to maintain electrolyzer 200 in a heated state adequate for electrolyzer 200 to instantaneously, or within a few minutes, be put into a hydrogen and oxygen producing mode (also referred to herein as an "operating mode").

During times when electrolyzer 200 is not operating to produce hydrogen and oxygen, it can be desirable to provide heat to and from heat storage system 206 to maintain or facilitate rapid heating of electrolyzer 200 to commence production of hydrogen quickly and efficiently at a later time. As such, thermal loop 208 can be operated to move heat from heat storage system 206 to heat exchanger 204, with the subsequently cooled working medium being returned to heat storage system 206. Water loop 212 can be operated to provide heat from HRSG 116 to heat exchanger 204, with the subsequently cooled water being returned to HRSG 116 either vial water loop 212 or lines [A] and [B]. In examples, transfer loop 210 can be operated to move heat from heat exchanger 204 to electrolyzer 200. Thus, heat can be moved from HRSG 116 to heat exchanger 204 via water loop 212, from heat exchanger 204 to heat storage system 206 via thermal loop 208, and from heat storage system 206 to electrolyzer 200 via transfer loop 210. As such, electrolyzer 200 can be actively maintained at a temperature where water within electrolyzer 200, e.g., electrolyte water, is ready to commence hydrogen and oxygen production.

In additional example, transfer loop 210 can be put in a standby mode, and water loop 212 and thermal loop 208 can be operated to transfer heat from HRSG 116 to heat exchanger 204 and then to heat storage system 206. In such case, when it is desirable to begin operating electrolyzer 200, heat from heat storage system 206 can be transferred to electrolyzer 200. As such, thermal loop 208 can be operated to move heat from heat storage system 206 to heat exchanger 204, with the subsequently cooled working medium being returned to heat storage system 206. Transfer loop 210 can be operated to provide heated transfer medium from heat exchanger 204 to electrolyzer 200, with the subsequently cooled transfer medium being returned to heat exchanger 204 for further heating. Water loop 212 can be operated to provide heat to heat exchanger 204 to recharge thermal loop 208 and/or transfer loop 210, with subsequently cooled water being returned to HRSG 116. For example, water loop 212 can be in direct thermal communication with transfer loop 210, with working medium of thermal loop 208 providing a heat transfer medium therebetween. Alternatively, water loop 212 can be idled.

During times when electrolyzer 200 is operating to produce hydrogen and oxygen, it can be desirable to capture heat generated by electrolyzer 200 for storage in heat storage system 206. As such, thermal loop 208 can be operated to move heat from heat exchanger 204 to heat storage system 206, with the subsequently cooled working medium being returned to heat exchanger 204. Transfer loop 210 can be operated to provide heated transfer medium from electrolyzer 200 to heat exchanger 204, with the subsequently cooled transfer medium being returned to electrolyzer 200 for further heating. Water loop 212 can be operated to provide heat to heat exchanger 204 to recharge thermal loop 208 and/or transfer loop 210, with subsequently cooled water being returned to HRSG 116. Alternatively, water loop 212 can be idled, particularly in cases where GTCC 104 is not operating at times when electrolyzer 200 is operating.

Although FIG. 2 is described with reference to heat being provided to heat storage system 206 via HRSG 116 and electrolyzer 200, heat can be provided to heat storage system 206 from additional or alternative sources. In examples, heat can be provided to heat exchanger 204 by converters 134 of electrolyzers (e.g., electrolyzer 200') that are being operated to keep other electrolyzers that are not operating (e.g., electrolyzer 200) in a ready state, thereby additionally cooling converters 134 associated with the operating electrolyzers. In additional examples, the heat can be provided to heat exchanger 204 via dedicated heating devices, which can comprise resistance heaters provided with electrical power from grid 128 (FIGS. 1A and 1B) or another source. In examples, the heating devices can comprise burners that can be provided with hydrogen fuel for combustion. In additional examples, heat form industrial processes, district heating sources and commercial building heat sources can be stored in heat storage system 206 via heat exchanger 204 and appropriate heat exchange devices. For example, heat pipes and heat pumps can be used to transfer heat from such sources to heat exchanger 204 or heat storage system 206.

In additional examples, electrolyzer heat retention system 202 can be operated to cool electrolyzer 200. In a configuration, electrolyzer heat retention system 202 can remove heat from a currently-operating electrolyzer 200 to facilitate operation of electrolyzer 200 at desirable operating temperatures. For example, transfer loop 210 can be operated to remove heat from electrolyzer 200 while electrolyzer 200 is operating to remove a small amount of heat to bring the temperature of electrolyzer 200 down to, but not below, a desirable operating range. In another configuration, electrolyzer heat retention system 202 can be configured to rapidly cool recently-stopped-operating electrolyzer 200 to facilitate more rapid maintenance operations. For example, transfer loop 210 can be operated to remove heat from electrolyzer 200 after electrolyzer 200 has stopped operating to more quickly reduce the temperature of electrolyzer 200, thereby allowing maintenance personnel to access and safely handle components of electrolyzer 200.

Figure 3:
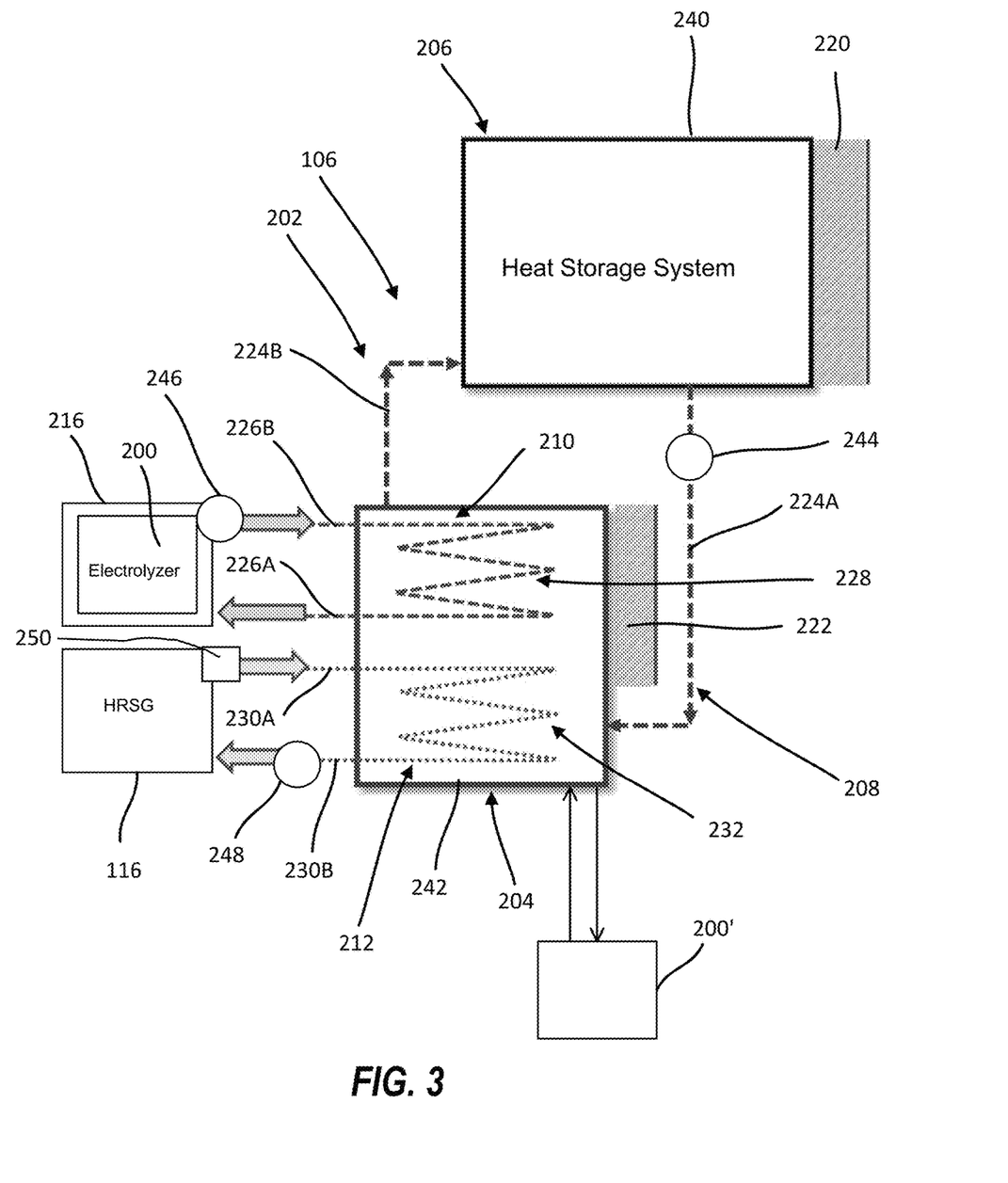
FIG. 3 is a schematic diagram illustrating an electrolyzer heat retention system of the present disclosure suitable for use with the hydrogen production system of FIG. 2.

FIG. 3 is a schematic diagram illustrating electrolyzer heat retention system 202 of the present disclosure suitable for use with hydrogen production system 106 of FIG. 2. Electrolyzer heat retention system 202 can be connected to electrolyzer 200 and HRSG 116. Heat retention system 202 can comprise heat exchanger 204, heat storage system 206, thermal loop 208, transfer loop 210 and water loop 212. Heat exchanger 204 can comprise insulation 222. Heat storage system 206 can comprise insulation 220. Thermal loop 208 can comprise first thermal line 224A and second thermal line 224B. Transfer loop 210 can comprise first transfer line 226A, second transfer line 226B and transfer heat exchange circuit 228. Water loop 212 can comprise first water line 230A, second water line 230B and water heat exchange circuit 232.

Heat storage system 206 can comprise a container or reservoir configured to store heat via storage of a working medium. In examples, heat storage system 206 can comprise storage vessel 240, such as a stainless-steel tank. Heat storage system 206 can be outfitted with insulation 220 to increase the capability for retaining heat within storage vessel 240. Insulation 220 can comprise any suitable insulation for retaining heat, such as fiberglass, foam, cellulose, and the like. Though insulation 220 is illustrated as being located on only one side of storage vessel 240, insulation 220 can be provided over all major surfaces of storage vessel 240 without interfering with various fluid lines and access ports. In additional examples, storage vessel 240 can be heated via storage in a heated building or via radiant panels. Storage vessel 240 can be connected to heat exchanger 204 via thermal loop 208. First thermal line 224A and second thermal line 224B can extend between storage vessel 240 and heat exchanger 204.

Heat exchanger 204 can comprise a container or reservoir configured to store heat via storage of a working medium. In examples, heat exchanger 204 can comprise housing 242. Heat exchanger 204 can be outfitted with insulation 222 to increase the capability for retaining heat within housing 242. Insulation 222 can comprise any suitable insulation for retaining heat, such as fiberglass, foam, cellulose, and the like. Though insulation 222 is illustrated as being located on only one side of housing 242, insulation 222 can be provided over all major surfaces of housing 242 without interfering with various fluid lines and access ports. In additional examples, housing 242 can be heated via storage in a heated building or via radiant panels. Housing 242 can fluidly connect first thermal line 224A and second thermal line 224B and can provide space for inclusion of heat exchange circuit 228 and heat exchange circuit 232. Housing 242 can also include access points for first transfer line 226A, second transfer line 226B, first water line 230A, and second water line 230B. First transfer line 226A, second transfer line 226B, first water line 230A, and second water line 230B can additionally be provided with external fins to facilitate heat transfer.

Thermal loop 208 can be configured to move a working medium back and forth between storage vessel 240 and housing 242. The working medium can comprise a material configured to absorb and retain heat. In examples, the working medium can comprise an ionic salt, a phase change material, glycol, calcium chloride, potassium hydroxide, or a potassium formate/water-based heat transfer medium. In examples, storage vessel 240 can be filled or partially filled with a material to facilitate retention of heat within the working medium located within storage vessel 240. For example, storage vessel 240 can be provided with one or more heat mass beds, such as a concrete pebble bed, that have a large thermal mass. In examples, storage vessel 240 can be locate underground or partially underground with the roof or top of vessel 240 including insulation 220.

In an example, the working medium can comprise a phase change material that can absorb heat when changing from a solid to a liquid and discharge heat when changing from a liquid to a solid. Thus, the phase change material can be stored in heat storage system 206 as a hot liquid and can be pumped to heat exchanger 204 as a liquid when needed to provide heating to heat exchanger 204. Within housing 242, the phase change material can cool, releasing heat to heat exchange circuits 228 and 232. The cooled phase change material can turn into a solid within housing 242. Thereafter, heat provided by heat exchange circuit 232 from HRSG 116 can be used to reheat the phase change material into a liquid state for pumping back to storage vessel 240. Additionally, when electrolyzer 200 is operational, heat from electrolyzer 200 can be delivered to housing 242 to reheat the phase change material.

In examples, thermal loop 208 can be configured as a thermosyphon loop. When operating as a thermosyphon, the working medium can be circulated between heat storage system 206 and heat exchanger 204 without the aid of a pump or compressor. As is known in the art, thermosyphon loops can produce cyclic flow from area of high heat to areas of low heat via natural convection phenomena. In examples, the working medium can be configured to circulate in a loop using pump 244. In examples, pump 244 can provide one-way flow between heat storage system 206 and heat exchanger 204. In other examples, pump 244 can be configured to provide two-way flow or two pumps can be used to provide opposite flow directions.

In examples, heat pipes can be used to transfer a fluid or medium between heat storage system 206 and heat exchanger 204. For example, as is known in the art, a fluid can be vaporized within heat exchanger 204 via heat from electrolyzer 200 and HRSG 116 and then condensed within heat storage system 206, thereby transferring heat without moving parts.

First heat exchange circuit 228 can comprise a coil or winding of pipe through which a transfer medium can flow. The transfer medium can comprise a material configured to quickly receive and discharge heat. In examples, the transfer medium can comprise lye. For example, the transfer medium can be configured to receive heat from one of electrolyzer 200 and heat exchanger 204 and transfer the heat to the other of electrolyzer 200 and heat exchanger 204 using lines 226A and 226B. In examples, the transfer medium can be configured to circulate in a loop using pump 246.

Second heat exchange circuit 232 can comprise a coil or winding of pipe through which water (H2O) can flow. The H20 can comprise heated feedwater or steam from HRSG 116. Heat from the feedwater or steam can be transferred from HRSG 116 to heat storage system 206 (via heat exchanger 204) through line 224B. Cooled H2O can be returned to HRSG 116 through line 230B. In examples, the H2O can be configured to circulate in a loop using pump 248. Valve 250 can be selectively operated to allow H2O into heat exchange circuit 232.

In examples, pumps 244, 246 and 248 can be operated using compressed hydrogen or oxygen from integrated power production system 100. Similarly, pumps 244, 246 and 248 can be operated using compressed air or nitrogen available from other sources, thereby reducing electrical consumption of electrolyzer heat retention system 202. Pumps 244, 246 and 248 and valve 250 can be controlled by controllers 120 and 122 (FIGS. 1A and 1B).

In an example, hot lye can flow into line 226B when electrolyzer 200 is operating. Cooled lye can travel back into electrolyzer 200 at line 226A. In examples, the lye can be at approximately 88 degrees C. within line 226B and approximately 70 degrees C. in line 226A. The working medium can travel across heat exchange circuit 228 and move into heat storage system 206 at line 224B. Heat storage system 206 can be maintained at approximately 80 degrees C. Cooled working medium can travel back to heat exchanger 204 at line 224A. Simultaneously, water can enter heat exchanger 204 from HRSG 116 at line 230A and can return to HRSG 116 at line 230B.

Figure 4:
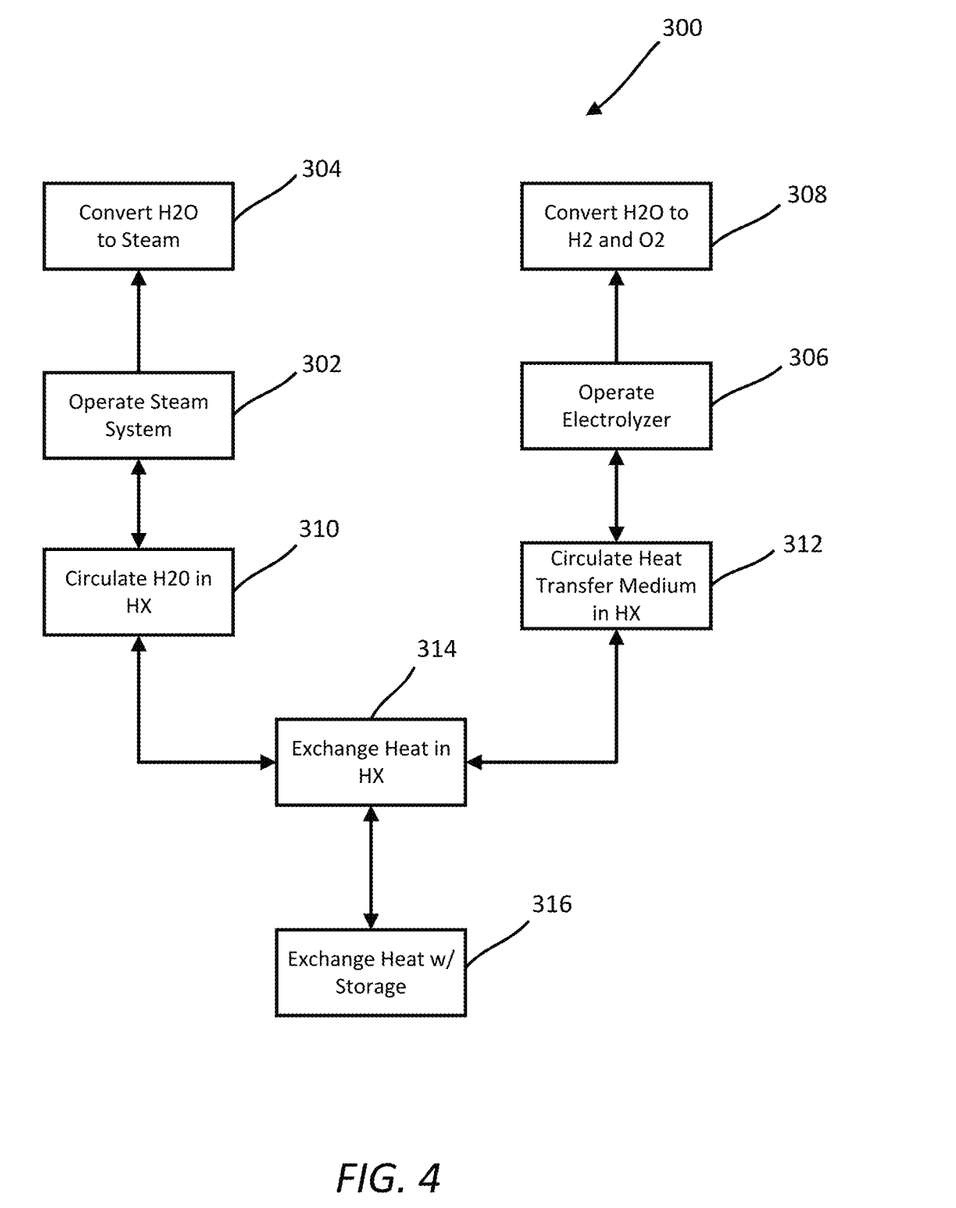
FIG. 4 is a line diagram illustrating operations of methods for heating electrolyzers in a gas turbine combined cycle power plant.

FIG. 4 is a line diagram illustrating operations of method 300 for heating electrolyzers 200 in gas turbine combined cycle power plant 104.

At operation 302, a steam system can be operated. For example, HRSG 116 of FIG. 1B can be operated. Operation of the steam system can include circulation of feedwater and steam that can have heat available for use in electrolyzer heat retention system 202.

At operation 304, water can be converted to steam. For example, HRSG 116 can utilize heat from exhaust gas of gas turbine 114 to convert feedwater to steam. The steam can thereby be used to rotate steam turbine 118 to produce rotational shaft power to generate electricity.

At operation 306, one or more electrolyzers can be operated. For example, electrolyzer 200 can be operated. In examples, electrolyzer 200 can be operating when the steam system of operation 302 is not operating.

At operation 308, water can be converted to hydrogen gas and oxygen gas. Electrolyzer 200 can be selectively operated when it is desirable to produce hydrogen gas and oxygen gas with electricity. Operation of electrolyzer 200 to produce hydrogen and oxygen gas can generate heat.

At operation 310, water from the steam system can be sent to a heat exchanger. For example, the water from the steam system can be circulated through heat exchange circuit 232 (FIG. 3) located within housing 242 of heat exchanger 204. The water can be selectively circulated when heating of heat exchanger 204 is desired.

At operation 312, a working medium can be circulated between the electrolyzer and the heat exchanger. For example, the working medium can circulate between jacket 216 surrounding electrolyzer 200 and heat exchanger 204 utilizing heat exchange circuit 228 (FIG. 3). The working medium can be selectively circulated depending on when heating or cooling of electrolyzer 200 is desired.

At operation 314, heat from the steam system can be transferred within the heat exchanger. For example, water from HRSG 116 within heat exchanger 204 can transfer heat to heat exchanger 204. At operation 314, heat from electrolyzer 200 can be transferred within heat exchanger 204. For example, the transfer medium from electrolyzer 200 can transfer heat to heat exchanger 204. Transfer of heat to heat exchanger 204 from the water and transfer medium can occur simultaneously or alternatively, depending on where heat is needed in electrolyzer heat retention system 202.

At operation 316, heat from the heat exchanger can be transferred to a heat storage system. For example, heat from heat exchanger 204 can be transferred to heat storage system 206. The heat stored within heat storage system 206 can be stored for contemporaneous or later use. That is, heat can be taken from heat storage system 206 to heat electrolyzer 200 simultaneously as heat is being put into heat storage system 206 from HRSG 116. Alternatively, heat can be put into heat storage system 206 by HRSG 116 without simultaneously heating electrolyzer 200.

Figure 5:
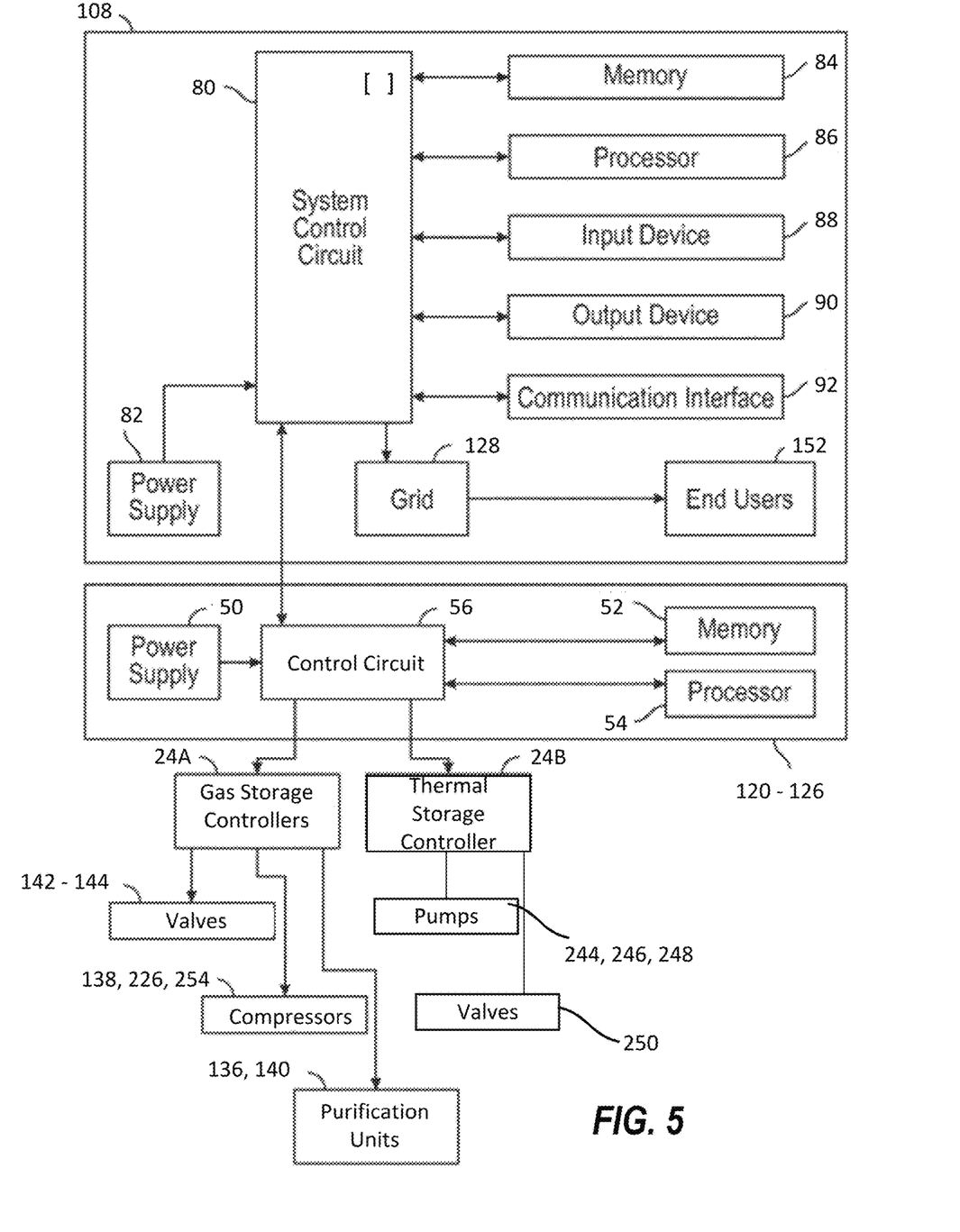
FIG. 5 is a schematic diagram illustrating components of a controller for operating an integrated power production system and controllers for operating a GTCC power plant, a hydrogen production system and an electrolyzer heat retention system of the present disclosure.

FIG. 5 is a schematic diagram illustrating components of controller 108 for operating integrated power production system 100 and controllers 120-126 for operating hydrogen production system 106, GTCC 104 and electrolyzer heat retention system 202. Controller 108 can include circuit 80, power supply 82, memory 84, processor 86, input device 88, output device 90 and communication interface 92. Controller 108 can be in communication with grid 128, which can provide power to end users or consumers 152. Controller 108 can also be in communication with controllers 120 and 122 for hydrogen production system 106 and controllers 124 and 126 for GTCC 104, which can be in communication with one or more sub-system controllers, such as storage controller 24A and battery and thermal storage controller 24B. Controller 24A can be in communication with hydrogen storage system 110 and oxygen storage system 112, as well as various components thereof, such as valves 142-144, compressor 138, turbine 226 and compressor 254, and purification systems 136 and 140. Controller 24B can be in communication with pumps 244-248 and other equipment useful in controlling and operating electrolyzer heat retention system 202, such as switches, valve 250 and other valves, motors and the like.

Controllers 120-126 and controllers 24A and 24B can also include various computer system components that facilitate receiving and issuing electronic instructions, storing instructions, data and information, communicating with other devices, display devices, input devices, output devices and the like. For example, power controllers 120-126 can each include power supply 50, memory 52, processor 54, control circuit 56 and the like.

Circuit 80 can comprise any suitable computer architecture such as microprocessors, chips and the like that allow memory 84, processor 86, input device 88, output device 90 and communication interface 92 to operate together. Power supply 50 and power supply 82 can comprise any suitable method for providing electrical power to controller 108 and controllers 120-126, respectively, such as AC or DC power supplies. Memory 84 and memory 52 can comprise any suitable memory devices, such as random access memory, read only memory, flash memory, magnetic memory and optical memory. Input device 88 can comprise a keyboard, mouse, pointer, touchscreen and other suitable devices for providing a user input or other input to circuit 80 or memory 84. Output device 90 can comprise a display monitor, a viewing screen, a touch screen, a printer, a projector, an audio speaker and the like. Communication interface 92 can comprise devices for allowing circuit 80 and controller 108 to receive information from and transmit information to other computing devices, such as a modem, a router, an I/O interface, a bus, a local area network, a wide area network, the internet and the like.

Controller 108 can be configured to operate grid 128 and, as such, can be referred to the "home office" for system 100. Grid 128 can comprise hydrogen production system 106, GTCC 104, renewable wind electricity source 130, renewable photovoltaic solar energy source 132, high voltage transmission lines that carry power from distant sources to demand centers, and distribution lines that connect consumers 152. Grid 128 can be configured to operate at a control frequency where all power input into the grid from disparate sources in input at the same frequency to facilitate integration of the power. In an example, grid 128 can operate at a control frequency of 60 Hertz (Hz).

Controller 108 can determine the demand being placed on grid 128, such as by monitoring the consumption of consumers 152. Controller 108 can coordinate generation of power from GTCC 104 and renewable electricity sources 130 and 132. Controller 108 can assign or instruct GTCC 104 how much power output they should contribute to grid 128, and such assignment may be dynamic and reactive based upon the capabilities and availability of any of GTCC 104 and renewable electric sources 130 and 132. Controller 108 can ensure that the total power generated by GTCC 104 and renewable electric sources 130 and 132 meets the power demand of consumers 152. If power demand of consumers 152 exceeds or is less than power supplied by GTCC 104 and renewable electric sources 130 and 132, controller 108 can dictate response strategies for GTCC 104. Thus, controller 108 can interface with controller 124 and 126 for GTCC 104.

Circuit 80 can communicate with, that is, read from and write to, a memory device such as memory 84. Memory 84 can include various computer readable instructions for implementing operation of grid 128. Thus, memory 84 can include instructions for monitoring demand on and power being supplied to grid 128. Circuit 80 can be connected to various sensors to perform such functions. Memory 84 can also include information that can assist controller 108 in providing instruction to controllers 120-126. For example, memory 84 can include the type, size (capacity), age, maintenance history, location, the location within the geography covered by grid 128, and proximity to consumers 152 of each of GTCC 104. Memory 84 can also include instructions for determining the percentage of GTCC 104, as well as other power plants, contribution to the total power supply.

Controllers 120-126 can be configured to operate GTCC 104 and hydrogen production system 106. Memory 52 can include various computer readable instructions for implementing operation of GTCC 104 and hydrogen production system 106. Thus, memory 102 can include instructions for monitoring a power generation assignment from controller 108, instructions for power generation for each generators 154 and 156, and the like. Memory 102 can additionally include instructions for operating electrolyzers 200 and electrolyzer heat retention system 202.

Additionally, memory 52 can include operational efficiency information, such as productive and economical efficiency information for each of generators 154 and 156, including gas turbine 114. For example, memory 52 can include the electrical production efficiency of each of turbine 114. Memory 52 can include economical information such as maintenance and economical history for gas turbine 114, as well as time since last service, repair, overhaul, refurbishment status, etc. Memory 52 can also include information relating to operational efficiency of GTCC 104 including the financial efficiency of each of gas turbine 114, such as various contractual obligations for operators of various power plants and manufacturers of and service providers for gas turbine 114.

Controllers 120-126 can operate or be in communication with controllers 24A and 24B to operate compressor 138, turbine 226, compressor 254, valves 142-144, purification systems 136 and 140, pumps 244-248, valve 25 and other control elements, as well as other components of system 100.

Controller 108 can work in conjunction with controllers 120-126 to operate controllers 24A and 24B to maximize or most efficiently operate system 100, such as by controlling operation of hydrogen production systems 106 to produce hydrogen when conditions on grid 128 permit and electrolyzer heat retention system 202. Thus, memory 52 and memory 84 can include instructions for operating or performing any of the methods described herein, such as those described with reference to FIG. 5.

Various Notes & Examples

Example 1 is a power plant comprises: a steam system; a first electrolyzer; a heat storage system; and a heat exchanger configured to exchange thermal energy between the steam system, the first electrolyzer and the heat storage system.

In Example 2, the subject matter of Example 1 optionally includes wherein the heat exchanger comprises: a heat exchanger housing fluidly connected to the heat storage system; a first heat exchange circuit disposed in the heat exchanger housing and fluidly connected to the first electrolyzer; and a second heat exchange circuit disposed in the heat exchanger housing and fluidly connected to the steam system.

In Example 3, the subject matter of Example 2 optionally includes wherein the heat storage system comprises a reservoir of a working medium.

In Example 4, the subject matter of Example 3 optionally includes wherein the working medium circulates between the reservoir and the heat exchanger housing via thermosyphon.

In Example 5, the subject matter of any one or more of Examples 3-4 optionally include a second electrolyzer connected to the heat exchanger.

In Example 6, the subject matter of any one or more of Examples 3-5 optionally include wherein the steam system is configured to transfer heat to the working medium.

In Example 7, the subject matter of Example 6 optionally includes wherein: the steam system comprises a heat recovery steam generator (HRSG) of a combined cycle power plant; and the second heat exchange circuit is connected to a condenser of the HRSG.

In Example 8, the subject matter of any one or more of Examples 3-7 optionally include wherein the first heat exchange circuit is configured to circulate a transfer medium between the heat exchanger and a jacket at least partially surrounding the electrolyzer.

In Example 9, the subject matter of Example 8 optionally includes a pump configured to circulate the transfer medium between the first heat exchange circuit and the electrolyzer; a valve configured to control flow of water from the steam system in the second heat exchange circuit; and a controller configured to selectively operate the pump and the valve to heat the electrolyzer.

In Example 10, the subject matter of any one or more of Examples 3-9 optionally include wherein the reservoir comprises at least one of an insulation layer and a heat mass bed.

Example 11 is a method of operating an electrolyzer in a combined cycle power plant, the method comprising: operating a steam system to convert water to steam; operating an electrolyzer in a standby mode, the electrolyzer configured to convert water and electricity to hydrogen and oxygen when the electrolyzer is in an operating mode; circulating water from the steam system through a heat exchanger; circulating a first heat transfer medium between the electrolyzer and the heat exchanger; and circulating a second heat transfer medium between the heat exchanger and a thermal storage container.

In Example 12, the subject matter of Example 11 optionally includes wherein: circulating the first heat transfer medium between the electrolyzer and the heat exchanger comprises circulating lye between the electrolyzer and the heat exchanger; and circulating the second heat transfer medium between the heat exchanger and the thermal storage container comprises circulating an ionic salt between the heat exchanger and the thermal storage container.

In Example 13, the subject matter of any one or more of Examples 11-12 optionally include wherein circulating water from the steam system through a heat exchanger comprises circulating feedwater or condensate from the steam system through the heat exchanger.

In Example 14, the subject matter of any one or more of Examples 11-13 optionally include wherein circulating the first heat transfer medium between the electrolyzer and the heat exchanger comprises: transferring heat from the electrolyzer to the first heat transfer medium while the electrolyzer is in the operating mode; and transferring heat from the first heat transfer medium to the thermal storage container for later use.

In Example 15, the subject matter of any one or more of Examples 11-14 optionally include wherein circulating the first heat transfer medium between the electrolyzer and the heat exchanger comprises: transferring heat from the thermal storage container to the first heat transfer medium; and transferring heat from the first heat transfer medium to the electrolyzer when the electrolyzer is in the standby mode or a start-up mode.

In Example 16, the subject matter of any one or more of Examples 11-15 optionally include wherein circulating water from the steam system through the heat exchanger comprises transferring heat from the steam system to the second heat transfer medium.

In Example 17, the subject matter of any one or more of Examples 11-16 optionally include wherein circulating the first heat transfer medium between the electrolyzer and the heat exchanger comprises transferring external waste heat of the electrolyzer to the first heat transfer medium.

In Example 18, the subject matter of any one or more of Examples 11-17 optionally include circulating a third heat transfer medium between an additional electrolyzer and the heat exchanger.

In Example 19, the subject matter of any one or more of Examples 11-18 optionally include wherein circulating the second heat transfer medium between the heat exchanger and the thermal storage container comprises moving the second heat transfer medium via thermosyphon or heat pipes.

Example 20 is an integrated power production system comprising: a combined cycle power plant comprising a gas turbine engine and a steam system; first and second generators configured to be driven by the gas turbine engine and the steam system to supply power to a grid system; an electrolyzer configured to convert water to hydrogen gas and oxygen gas with an electrical input; an electrolyzer heat retention system comprising: a heat storage system; and a heat exchanger comprising: a first heat exchange circuit in thermal communication with the electrolyzer; a second heat exchange circuit in thermal communication with the steam system; and a third heat exchange system in thermal communication with the heat storage system; and a controller configured to: transfer heat from the second heat exchange circuit to the third heat exchange circuit; and transfer heat from the third heat exchange circuit to the first heat exchange circuit.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A combined-cycle power plant comprising:
    a gas turbine engine comprising:
        a compressor configured to produce compressed gas;
        a combustor configured to produce combustion gas from the compressed gas and a fuel; and
        a turbine configured to receive the combustion gas to produce rotational shaft power;
    a steam system configured to generate steam from water using heat from the combustion gas generated by the gas turbine engine;
    a first electrolyzer configured to convert water into a hydrogen gas and an oxygen gas, wherein the gas turbine engine is configured to receive at least a portion of the hydrogen gas for combustion;
    a heat exchange system configured to obtain heat from the steam system and provide heat to the first electrolyzer to maintain the first electrolyzer in a standby state when not operating, wherein the heat exchange system comprises a heat storage system configured to retain thermal energy of one or both of the steam system and the first electrolyzer for use at a later time; and
    a controller for operating the heat exchange system, the controller configured to operate the heat storage system to:
        provide heat to the heat storage system when the first electrolyzer is operating; and
        provide heat to the first electrolyzer when the first electrolyzer is not operating.

2. The combined-cycle power plant of claim 1, further comprising a controller configured to maintain the first electrolyzer at a temperature above ambient temperature and below an operating temperature.

3. The combined-cycle power plant of claim 1, further comprising a hydrogen storage system configured to receive hydrogen from the first electrolyzer and from which the gas turbine engine receives hydrogen gas for combustion.

4. The combined-cycle power plant of claim 1, wherein the heat exchange system comprises:

a first heat exchange circuit fluidly connected to the first electrolyzer to circulate a first heat transfer medium between the first electrolyzer and the heat exchange system;

a second heat exchange circuit fluidly connected to the steam system to circulate water or steam between the steam system and the heat exchange system; and a third heat exchange circuit fluidly connected to the heat storage system to circulate a second heat transfer medium between the heat storage system and the heat exchange system.

5. The combined-cycle power plant of claim 4, wherein the heat exchange system further comprises a heat exchanger for receiving the first heat exchange circuit, the second heat exchange circuit and the third heat exchange circuit.

6. The combined-cycle power plant of claim 5, wherein the first heat exchange circuit is configured to heat an exterior of the first electrolyzer.

7. The combined-cycle power plant of claim 5, wherein:
the heat exchanger includes a housing to receive the first heat exchange circuit, the second heat exchange circuit and the third heat exchange circuit; and
the first electrolyzer includes a jacket to receive the first heat exchange circuit.

8. The combined-cycle power plant of claim 4, wherein:
the first heat exchange circuit circulates the first heat transfer medium in a loop between the first electrolyzer and the heat exchange system;
the second heat exchange circuit circulates the water or steam in a loop between the steam system and the heat exchange system; and
the third heat exchange circuit circulates the second heat transfer medium in a loop between the heat storage system and the heat exchange system.

9. The combined-cycle power plant of claim 4, wherein the heat storage system comprises a reservoir for storing a volume of the second heat transfer medium.

10. The combined-cycle power plant of claim 4, further comprising a second electrolyzer connected to the heat exchange system via a fourth heat exchange circuit.

11. The combined-cycle power plant of claim 4, wherein the second heat transfer medium is configured to transfer heat from the water or steam of steam system to the first heat transfer medium of the first electrolyzer.

12. The combined-cycle power plant of claim 4, wherein:
the steam system is configured to transfer heat to the heat exchange system;
the first electrolyzer is configured to receive heat from or transfer heat to the heat exchange system; and
the second heat transfer medium is configured to store heat from the steam system for transferring to the first electrolyzer.

13. The combined-cycle power plant of claim 4, wherein:
the first heat transfer medium comprises lye; and
the second heat transfer medium comprises an ionic salt.

14. The combined-cycle power plant of claim 1, wherein the heat storage system comprises an insulated storage tank for storing a heat transfer medium.

15. The combined-cycle power plant of claim 1, wherein the heat storage system is configured to retain thermal energy from the steam system when the steam system is operating for use when the steam system is not operating.

16. A method of operating a combined-cycle power plant and an electrolyzer, the method comprising:

operating a gas turbine engine to produce combustion gas and rotational shaft power;

generating steam from water with a steam system using heat from the combustion gas as a heating source;

storing heat from the steam or water in a heat storage system for a period of time when the electrolyzer is operating;

heating the electrolyzer with heat from the water or steam from the steam system after the heat has been stored in the heat storage system for the period of time to maintain the electrolyzer in a standby mode when not operating;

operating the electrolyzer to output hydrogen gas and oxygen gas; and providing at least a portion of the hydrogen gas to the gas turbine engine as fuel.

17. The method of claim 16, further comprising:
driving a steam turbine with the steam from the steam system;
generating electricity with the gas turbine engine; and
generating electricity with the steam turbine.

18. The method of claim 16, wherein:
heating the electrolyzer with water or steam from the steam system comprises maintaining the electrolyzer at a temperature above ambient temperature and below an operating temperature; and
operating the electrolyzer to output hydrogen and oxygen comprises bringing the electrolyzer up to an operating temperature.

19. The method of claim 16, further comprising using a heat transfer medium to transfer heat from the steam or water to the electrolyzer.

20. A combined-cycle power plant comprising:
a gas turbine engine comprising:
a compressor configured to produce compressed gas;
a combustor configured to produce combustion gas from the compressed gas and a fuel; and
a turbine configured to receive the combustion gas to produce rotational shaft power;
a steam system configured to generate steam from water using heat from the combustion gas generated by the gas turbine engine;
a first electrolyzer configured to convert water into a hydrogen gas and an oxygen gas, wherein the gas turbine engine is configured to receive at least a portion of the hydrogen gas for combustion; and
a heat exchange system configured to obtain heat from the steam system and provide heat to the first electrolyzer to maintain the first electrolyzer in a standby state when not operating, wherein the heat exchange system comprises a heat storage system configured to retain thermal energy of one or both of the steam system and the first electrolyzer for use at a later time, the heat exchange system comprising:
a first heat exchange circuit fluidly connected to the first electrolyzer to circulate a first heat transfer medium between the first electrolyzer and the heat exchange system;
a second heat exchange circuit fluidly connected to the steam system to circulate water or steam between the steam system and the heat exchange system; and
a third heat exchange circuit fluidly connected to the heat storage system to circulate a second heat transfer medium between the heat storage system and the heat exchange system.

* * * * *